United States Patent [19]

Van Dyke

[11] 3,830,987

[45] Aug. 20, 1974

[54] TWO POSITION TELEPHONE HANDSET SUPPORT

[76] Inventor: Lyle H. Van Dyke, 4411 S.W. Twombly, Portland, Oreg. 97201

[22] Filed: Jan. 11, 1973

[21] Appl. No.: 322,854

[52] U.S. Cl. .......... 179/157
[51] Int. Cl. .......... H04m 1/05
[58] Field of Search .......... 179/157

[56] References Cited

UNITED STATES PATENTS

| | | | |
|---|---|---|---|
| 2,640,111 | 5/1953 | Samsky et al. | 179/157 |
| 2,816,963 | 12/1957 | Norton | 179/157 |
| 3,025,360 | 3/1962 | Van Dyke | 179/157 |

*Primary Examiner*—William C. Cooper
*Attorney, Agent, or Firm*—Clegg, Cantrell & Crisman

[57] ABSTRACT

A telephone handset support adapted for use on either shoulder of a person to enable the person to speak and listen over a telephone handset without using his hands. The support includes a curved base member shaped to fit over the top of a person's shoulder, an arm which extends from the base member upwardly when the base member is placed on a person's shoulder, a holder mounted on the end of the arm to extend laterally therefrom and rotatable about an axis perpendicular to the arm between a first and second position and apparatus for rigidly securing the holder in either the first or second position. A flexible band is looped over a telephone handset positioned in the holder to secure it therein. The holder includes apparatus for alternatively tightening or loosening the band loop to enable insertion and removal of a telephone handset. Rotating the holder to and securing it in the first position enables use of the support on a person's left shoulder whereas rotating the holder to and securing it in the second position enables use of the support on a person's right shoulder.

10 Claims, 4 Drawing Figures

TWO POSITION TELEPHONE HANDSET SUPPORT

BACKGROUND OF THE INVENTION

This invention relates to a telephone handset support for use on a person's shoulder to enable the person to listen and speak over a telephone handset without using his hands and more particularly to a support which may be used on either the left or right shoulder of a person.

Telephone handset supports adapted for use on a person's shoulder have long been used to enable the user to comfortably listen and speak over the telephone without having to hold the handset by hand. Because most such supports are constructed to hold the handset in one position only, the supports can only be used on one shoulder. This limitation, of course, could result in an inconvenience if, for example, a telephone set equipped with such a support were located on the wrong side of the desk of a person normally using the telephone set, i.e., at a position far from the shoulder on which the support is to be used.

It is an object of the present invention to provide a telephone handset support which can be manually configured for use on either the right or left shoulder as the user desires.

It is another object of the present invention to provide such a support which is simple in construction, easy to manually reconfigure for use on either shoulder, and which is sturdy and rigid in either configuration.

DESCRIPTION OF THE DRAWINGS

A complete understanding of the present invention and of the above and other objects and advantages thereof may be gained from a consideration of the following detailed description of an illustrative embodiment presented in connection with the accompanying drawings in which.

DETAILED DESCRIPTION

Figures 1, 2, 3, 4:
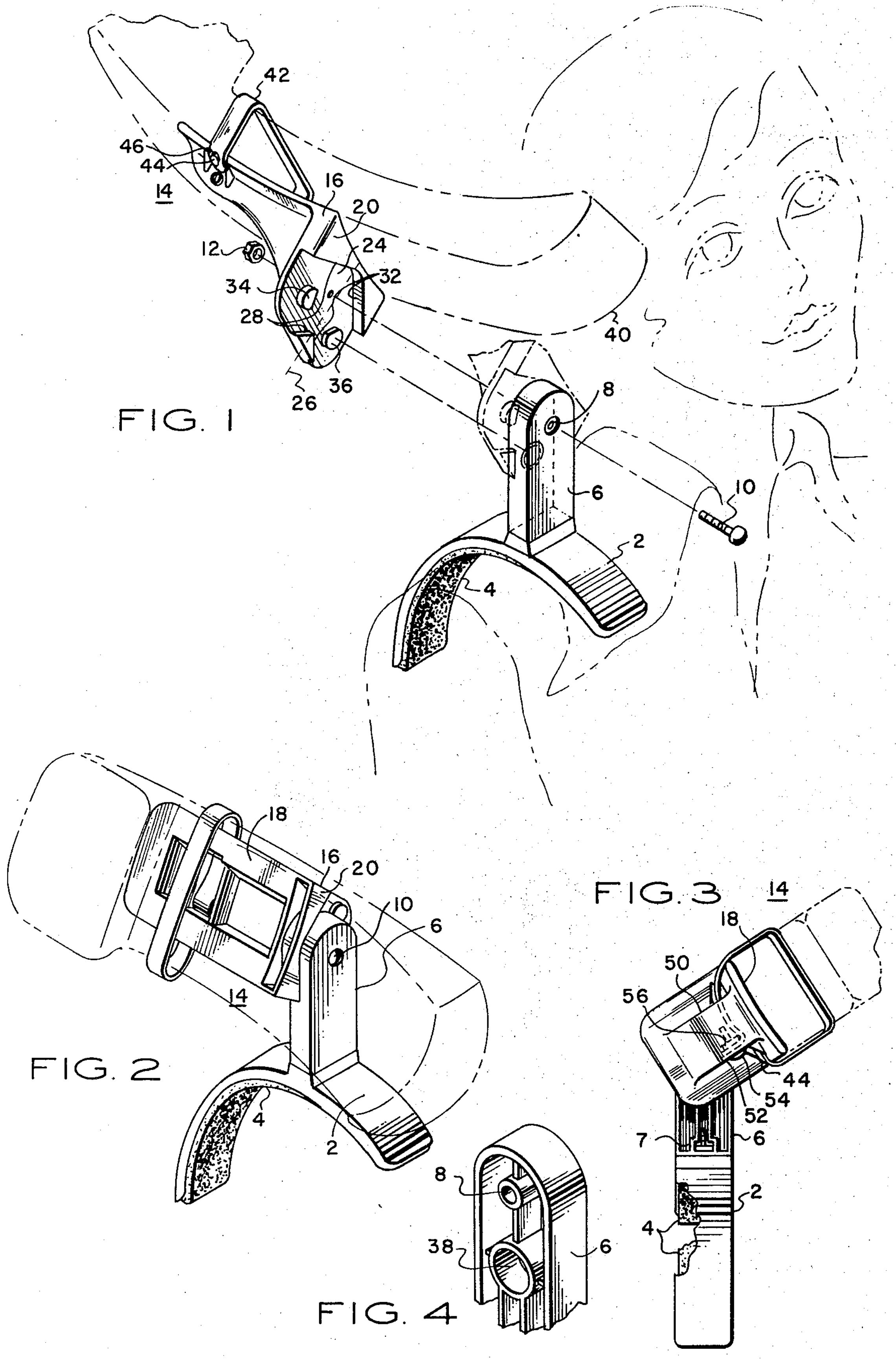
FIG. 1 shows a perspective exploded view of a telephone handset support made in accordance with the principles of the present invention and configured in a first position.
FIG. 2 shows a perspective view of the telephone handset configured in a second position.
FIG. 3 shows a back view of the telephone handset support.
FIG. 4 shows the backside of the arm of the support of FIG. 1.

The telephone handset support shown in the drawings is adapted for use with what is known as the Trimline telephone. The support includes a curved base member 2 shaped to substantially conform to and fit on top of a person's shoulder. On the underside or concave portion of the base member 2 is a strip of sponge-like material extending substantially the full length and width of the base member. Such material could illustratively be affixed to the underside of the base member 2 by glue or other adhesive. The base member 2 is placed on a person's shoulder so that the material 4 directly contacts the shoulder. The construction and use of such curved base members for telephone handset supports are well-known in the art.

An arm 6 is affixed to the upper or convex side of the base member 2 so that when the base member is placed on a person's shoulder, the arm 6 extends generally upwardly. The arm 6 is secured to the base member 2 by a screw and nut 7 shown in FIG. 3. A hole 8 is located near the upper end of the arm 6 to accommodate a screw 10. The hole 8 is counter sunk to enable the head of the screw 10 to seat below the surface of the arm 6. The screw 10 and a nut 12, which is screw threaded on the screw, secure a holder, generally designated by the numeral 14, to the arm 6.

The holder 14 is adapted to be rigidly secured on the arm 6 in either of two positions. One such position is indicated in FIG. 1 and the other position in FIG. 2. The holder 14 is secured in each of these positions by simply tightening the screw 10 on the nut 12. If it is desired to change the holder from one position to the other, the screw is loosened and the holder is rotated about the screw (i.e., about an axis substantially perpendicular to the arm 6) to the other position where the screw 10 and nut 12 can be tightened to rigidly secure the holder 14 in the other position.

The holder 14 includes a body member 16 having first and second surface areas 18 and 20 respectfully, forming substantially a right angle with respect to each other. A channel 24 is formed in surface area 20 as shown in FIG. 1, with the channel having a bend at a center line 26 of the body member 16. The channel 24 may be viewed as having a first pair of parallel side walls 28 on one side of the center line 26 and a second pair of parallel side walls 32 on the other side of the center line 26, with the first pair forming a predetermined angle with the second pair in the plane of rotation of the holder 14. The side walls of each pair are spaced so as to snugly accommodate the arm 6 therebetween as shown in FIGS. 1 and 2. Thus, FIG. 1 shows the arm 6 positioned in the channel 24 between side walls 32 and FIG. 2 shows the arm 6 positioned between the side walls 28. When the screw 10 is tightened in the nut 12 in either position shown in the drawings, the corresponding side walls of the channel 24 prevent rotational movement of the holder 14 to thereby rigidly secure the holder in fixed relation to the arm 6.

A pair of cylindrical bosses 34 and 36 spaced on either side of the center line 26, extend from the floor of the channel 24 outwardly. The arm 6 has a cylindrical well 38 formed therein to snugly accommodate the cylindrical bosses 34 and 36 (see FIG. 4). Thus, when the holder 14 is configured in the position shown in FIG. 1, the cylindrical boss 36 would fit into the well 38 and when the holder 14 were configured as shown in FIG. 2, the cylindrical boss 36 would fit into the well. Providing the cylindrical bosses 34 and 36 and the well 38 gives additional rigidity to the coupling of the holder 14 and arm 6 to prevent rotational movement of the holder 14 with respect to the arm 6. As indicated earlier, to change the holder 14 from one position to the other, the screw 10 is loosened to enable slight separation of the holder 14 from the arm 6 so that the arm clears the bosses 34 and 36 and bottom side wall of the channel 24 to enable the holder 14 to be rotated to the other position and there secured.

The surface area 18 of the body member 16 is contoured to accommodate and fit the back portion of a telephone handset 40. As indicated earlier, the type of handset for which the support is the Trimline telephone handset. A nipple 44 is formed on one side of the body member 16 and extends in a direction generally opposite the direction to which the contoured surface area 18 faces. A flexible band 42 is looped from the nipple 44 over the contoured surface area 18 to the other side of the body member 16. The band 42 has an opening 46 to enable insertion of the nipple 42 therein.

The body member 16 includes a pair of parallel walls 50 and 52 on the underneath side thereof opposite the contoured surface 18. The band 42 extends through an opening in the wall 50 to a point midway between the walls 50 and 52. The end of the band 42 positioned between the walls 50 and 52 has an opening therein and is bent downwardly so as to align the opening with another opening in the wall 52 (see FIG. 3). A screw 54 is inserted through the opening in the wall 52 and through the opening in the band 42 and then screw threaded into a nut 56. When the head of the screw 54 is seated against the wall 52 and then tightened, the nut 56 is drawn toward the screw head to engage and pull the band 42 toward the wall 52. If a telephone handset 40 is placed within the loop formed by the band 42, this tightening of the screw 54 secures to the nipple 44 the end of the band 42 having the opening 46; this is because of the tension applied to the band in a direction transverse to the nipple 44. After placing a telephone handset 40 within the loop formed by the band 42, the screw 54 would be tightened until the handset 40 was tightly secured in the holder 14. Of course, to remove handset 40 from the holder 14, the screw 54 would be loosened to relieve the tension on the band 42 so that the end of the band could be slipped from the nipple 44 and the handset removed.

The support described above might illustratively be constructed of molded plastic or other suitable material. The band 42 might illustratively be made of a thin but strong flexible metal or alloy.

With a telephone handset 40 secured in the holder 14 in the position illustrated in FIG. 1, the support would be configured for use on a person's right shoulder; and the configuration illustrated in FIG. 2 is for use of the support on a person's left shoulder. In either position, the support holds the telephone handset by the person's ear and mouth so that the person can listen and speak over the telephone without using his hands.

It is to be understood that the above-described embodiment is only illustrative of the principles of the present invention. Other embodiments may be described by those skilled in the art without departing from the spirit and scope of the invention.

I claim:

1. A telephone handset support including
- a curved base member adapted to rest on a person's shoulder,
- a holder member adapted to be attached to a telephone handset,
- an arm affixed to and projecting laterally from one of the members,
- means for securing the arm to the second of said members in spaced relation to the first of said members and in either a first position or a second position in angular relation to the first position so as to permit placement and use of the support and handset on either shoulder of a person,
- the securing means comprising a first pair of opposed means on said second member for disposing said arm in said first position,
- a second pair of opposed means extending in angular relation to the first pair of opposed means for disposing said arm in the second position,
- each pair of opposed means being spaced complementarily to the width of said arm for relatively snug engagement with opposed side of the latter,
- coacting means on said arm and on said second member between each pair of opposed means for confining said arm against longitudinal displacement relative to said second member,
- and fastening means for detachably connecting said arm to said second member in either of its positions.

2. A telephone handset support as defined in claim 1 wherein said securing means includes
- a first channel formed by said first pair of opposed means,
- and a second channel formed by the second pair of opposed means in angular relation to the first channel,
- each of the channels being substantially complementary to said arm.

3. A telephone handset support as defined in claim 1 wherein each pair of the opposed means of said securing means includes
- a pair of spaced surfaces facing each other,
- the pair of spaced surfaces of said first pair of opposed means being disposed in angular relation to the pair of spaced surfaces of the second pair of opposed means,
- each of said pairs of spaced surfaces being substantially complementary to the opposed sides of said arm.

4. A telephone handset support as defined in claim 1 wherein the coacting means for confining said arm against longitudinal displacement relative to said second member includes
- at least one boss,
- and at least one complementary recess for receiving the boss.

5. A telephone handset as defined in claim 1 wherein
- said arm is affixed to and projects laterally from the curved base member,
- the securing means forming a part of the holder member.

6. A telephone handset support as defined in claim 1 wherein the coacting means for confining said arm against longitudinal displacement relative to said second member includes
- a projection between each pair of the opposed means of said securing means,
- and a complementary recess for receiving one of the projections in each of the positions of said arm.

7. A telephone handset support as defined in claim 1 wherein each pair of the opposed means of said securing means includes
- a pair of spaced facing surfaces forming a channel therebetween on said second member,
- the channel between the pair of facing surfaces of said first pair of opposed means intersecting and extending in angular relation to the channel between the pair of facing surfaces of the second pair of opposed means,
- each of said channels being substantially complementary to said arm.

8. A telephone handset support as defined in claim 7 wherein the coacting means for confining said arm against longitudinal displacement relative to said second member includes at least one boss, and at least one complementary recess for receiving the boss.

9. A telephone handset as defined in claim 7 wherein said arm is affixed to and projects laterally from the curved base member, the securing means forming a part of the holder member.

10. A telephone handset support as defined in claim 7 wherein the coacting means for confining said arm against longitudinal displacement relative to said second member includes a projection in each channel, and a complementary recess in said arm for receiving one of the projections in each of the positions of said arm.

* * * * *